April 19, 1927.

L. JOHNSTON 1,625,366

CABLE AND TROLLEY CLAMP

Filed Sept. 9, 1926

Inventor

Lynn Johnston,

By Murray and Gugelter

Attorneys

Patented Apr. 19, 1927.

1,625,366

UNITED STATES PATENT OFFICE.

LYNN JOHNSTON, OF CINCINNATI, OHIO, ASSIGNOR TO THE ELECTRIC RAILWAY EQUIPMENT COMPANY, OF CINCINNATI, OHIO, A CORPORATION OF OHIO.

CABLE AND TROLLEY CLAMP.

Application filed September 9, 1926. Serial No. 134,525.

This invention relates to hangers or clamps for supporting both feed cable and trolley wire and has for an object the provision of such device whereby independent clamping of the feed cable and the trolley wire may be had.

Another object is to provide a device of this kind which is simple and inexpensive of manufacture.

Another object is to provide a device of this kind in the manufacture of which machine work is practically eliminated.

These and other objects are attained by the means described herein and disclosed in the accompanying drawings, in which.

Figures 1, 2:
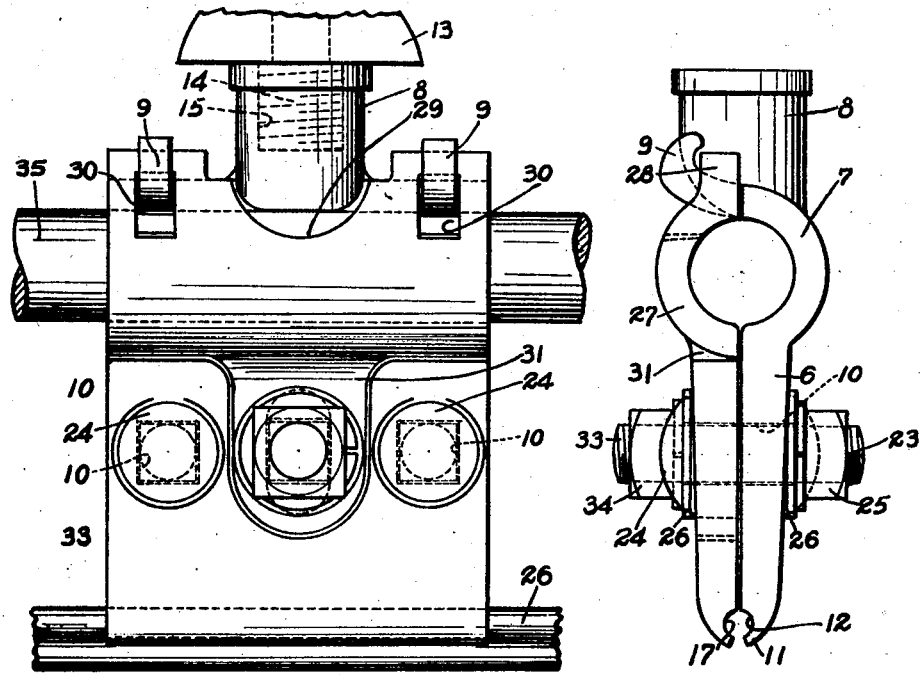
Fig. 1 is a side elevational view of a device of my invention supported from a suitable insulating hanger and having a feed cable and a trolley wire associated therewith.
Fig. 2 is an end elevational view of the device shown in Fig. 1.

The device of my invention comprises a plate 6 having a substantially semi-cylindrical off-set portion 7 and a threaded socket 8 extending from the semi-cylindrical portion. Adjacent each end of the semi-cylindrical portion 7 is an integral hook portion 9. The plate 6 has three transverse perforations 10 disposed substantially on the longitudinal center thereof, and adjacent its longitudinal bottom edge 11 is provided with a substantially semi-circular groove 12. The part just described is adapted to be suspended from a suitable insulating hanger 13 by threaded engagement of a stud 14 in the threaded bore 15 of the socket 8.

Figure 3:
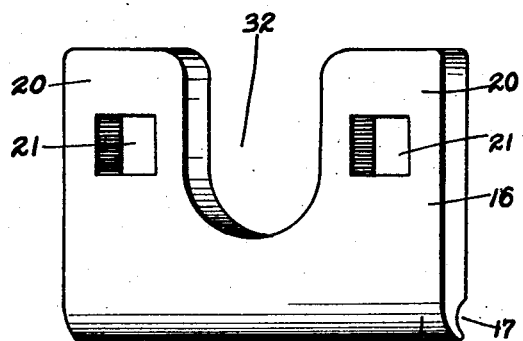
Fig. 3 is a perspective view of a part forming a detail of my invention.

A plate 16 (see Fig. 3) has a longitudinal groove 17 adjacent its curved bottom edge 18 and is provided at its top with a pair of arms 20, each of which has a square perforation 21 extending therethrough. A pair of bolts 23 may be provided with rounded heads 24 and having square shank portions adjacent the heads and are adapted to be inserted through the perforations 21 and through the endmost perforations 10 in the plate 6. Suitable nuts 25 and washers 26 are placed upon the bolts 23 for tightly binding the plates 6 and 16 together with the longitudinal grooves 12 and 17 opening toward one another and serving to receive and clamp a trolley wire 26. A semi-cylindrical member 27 having a top rib 28 cut away as at 29 to permit the neck of socket 8 to seat therein, is adapted to be positioned opposite the hollow or grooved side of semi-cylindrical portion 7 of plate 6. The mounting of member 17 is accomplished by providing it with suitable apertures 30 through which the hooks 9 extend for suspending said member 27 and permitting movement thereof toward and away from semi-cylindrical portion 7. The lower portion of member 27 has an integral perforate lug 31 of a size and shape to permit entry thereof in the space 32 between the arms 20 of plate 16. A suitable bolt 33 extends through the centermost perforation 10 in plate 6 and through the perforation in the lug 31, suitable lock washers and nuts 34 serving to clamp the lug 31 to the plate 6.

From the foregoing it will be readily apparent that when bolt 33 is removed, the member 27 may be lifted away from the plate 6 and semi-cylindrical portion 7 thereof and may also be entirely removed therefrom so that a feed cable 35 may be inserted between the semi-cylindrical portions 7 and 27 and then clamped securely between them. It will also be noted that the plate 16 may also be independently loosened or removed without disturbing the relation of the parts which clamp the feed cable so that a trolley wire 26 may be inserted or removed. This independent manipulation of the clamping means is very effective for permitting the taking up of slack in either wire without disturbing the remaining one and also affords considerable convenience in the original hanging of said wires. It should be noted that all of the parts of my invention may be inexpensively manufactured, such parts consisting entirely of castings, the single machine operation required being that of tapping the threads 15 in the socket 8.

The devices of my invention are of especial advantage in mines and in other places where head room for workmen is limited. The clamps project but a short distance downwardly from the roof or ceiling structure, thereby minimizing the danger of contact by workmen. At the same time they are easy of access for installation and adjustment of both feed cable and trolley wires, because of the convenient positioning of the fastening means.

What I claim is:

1. A cable and trolley clamp comprising a plate member having spaced grooves therein, integral hook members adjacent one of said grooves, a semi-cylindrical member having apertures therein for receiving the hooks on the first mentioned plate member whereby said semi-cylindrical member is suspended from the first mentioned plate member, an integral perforate lug carried by said semi-cylindrical member, means extending through the perforation in said lug for clamping it to the first mentioned plate member and a third member comprising a plate having a semi-circular groove therein adapted to be independently secured to the first mentioned plate member.

2. In a device of the class described a combination of a plate having a pair of spaced grooves on one face thereof, a grooved member adapted for mounting upon the plate adjacent one of its grooves for clamping a feed cable therein, a second plate having a groove therein adapted together with the remaining groove in the first mentioned plate, to receive a trolley wire and means for clamping the trolley clamping members together independently of the cable clamping means.

3. In a device of the class described the combination of a vertically depending plate having a pair of transverse grooves therein and a pair of independent grooved members each having a groove therein complementary to one of the grooves in the plate for independently clamping a feed cable and trolley wire.

4. In a device of the class described, the combination of a socket for mounting on a stud, an integral plate extending from the socket and having a transverse groove adjacent the socket and a second transverse groove adjacent the edge of the plate and independent intermeshing members grooved complementary to the grooves in the plate and means for separately mounting said independent members to the plate.

5. In a device of the class described, the combination of a plate having spaced transverse grooves on one side thereof and perforations intermediate the grooves, a hook on said plate adjacent one of the grooves, a grooved member having apertures for receiving the hook on the plate, a lug on the grooved member provided with a perforation aligned with one of the perforations in the plate, a second plate having perforate arms adapted to receive between them the lug on the grooved member, the perforations in said arms being adapted to alignment with other perforations in the plate and independent securing means insertable in the aligned perforations in the lug and plate and in the plate members.

6. In a device of the class described, the combination with an insulated depending stud of a plate provided with transverse grooves, a socket on the plate for attachment to the stud, and independent complementary members adapted for separate attachment to the plate for clamping separate wires in each of the grooves and electrically connecting them.

In testimony whereof, I have hereunto subscribed my name this 3rd day of September, 1926.

LYNN JOHNSTON.